United States Patent
Pan et al.

(10) Patent No.: US 11,885,762 B2
(45) Date of Patent: Jan. 30, 2024

(54) IRIDIUM/IRIDIUM OXIDE ELECTRODE FOR QUANTITATIVELY DETECTING PH IN SULFIDE ION ENVIRONMENT, AND PREPARATION METHOD AND USE THEREOF

(71) Applicant: ZHEJIANG UNIVERSITY, Zhoushan (CN)

(72) Inventors: Yiwen Pan, Zhoushan (CN); Yunwen Shen, Zhoushan (CN); Xiaoping Wang, Zhoushan (CN); Zhentao Sun, Zhoushan (CN)

(73) Assignee: ZHEJIANG UNIVERSITY, Zhoushan (CN)

( * ) Notice: Subject to any disclaimer, the term of this patent is extended or adjusted under 35 U.S.C. 154(b) by 0 days.

(21) Appl. No.: 18/211,303

(22) Filed: Jun. 19, 2023

(65) Prior Publication Data

US 2023/0333046 A1 Oct. 19, 2023

Related U.S. Application Data

(63) Continuation of application No. PCT/CN2021/140251, filed on Dec. 22, 2021.

(30) Foreign Application Priority Data

Dec. 28, 2020 (CN) .................. 202011581887.X

(51) Int. Cl.
*G01N 27/333* (2006.01)
(52) U.S. Cl.
CPC .................. *G01N 27/3335* (2013.01)
(58) Field of Classification Search
None
See application file for complete search history.

(56) References Cited

U.S. PATENT DOCUMENTS 10,444,180 B1 10/2019 Hunter et al.

FOREIGN PATENT DOCUMENTS

| CN | 1439032 A | 8/2003 |
|---|---|---|
| CN | 1869675 A | 11/2006 |

(Continued)

OTHER PUBLICATIONS

Aida Karimi, et al., Investigation, modeling, and optimization of parameters affecting sulfonated polyether ether ketone membrane-electrode assembly, International Journal of Hydrogen Energy, 2019, pp. 1096-1109, vol. 44.

(Continued)

*Primary Examiner* — J. Christopher Ball
(74) *Attorney, Agent, or Firm* — Bayramoglu Law Offices LLC

(57) ABSTRACT

An iridium/iridium oxide electrode for quantitatively detecting pH in a sulfide ion environment, and a preparation method and use thereof are provided. In the present disclosure, a sensitive layer of the iridium/iridium oxide electrode is coated with a sulfonated polyether ether ketone/ionic liquid (SPEEK/IL) sandwich structure. The SPEEK/IL sandwich structure includes two layers of SPEEK/SiO$_x$/IL composite film and one layer of SPEEK film. The SPEEK film is arranged on an outermost layer. The SPEEK/IL sandwich structure covered on a surface of the electrode has an isolation effect on ions other than hydrogen ions, and especially shows a desirable isolation effect on sulfide ions with a smaller ion size. In this way, the electrode is not easily disturbed by redox substances in a complex aqueous environment.

13 Claims, 6 Drawing Sheets

(56) References Cited

FOREIGN PATENT DOCUMENTS

| | | | |
|---|---|---|---|
| CN | 101210902 A | 7/2008 |
| CN | 103698377 A | 4/2014 |
| CN | 105047844 A | 11/2015 |
| CN | 105372308 A | 3/2016 |
| CN | 109313120 A | 2/2019 |
| CN | 109923242 A | 6/2019 |
| CN | 112798669 A | 5/2021 |

OTHER PUBLICATIONS

Yuede Pan, et al., Introducing ion-transport-regulating nanochannels to lithium-sulfur batteries, Nano Energy, 2017, pp. 205-212, vol. 33.

Zhun Li, et al., Addition of modified hollow mesoporous organosilica in anhydrous SPEEK/IL composite membrane enhances its proton conductivity, Journal of Membrane Science, 2021, pp. 1-10, vol. 620, 118897.

Leticia Guerreiro Da Trindade, et al., Modification of Sulfonated Poly(ether ether ketone) Membranes by Impregnation With the Ionic Liquid 1-Butyl-3-methylimidazolium tetrafluoroborate for Proton Exchange Membrane Fuel Cell Applications, Polymer Engineering and Science, 2016, pp. 1037-1044.

IRIDIUM/IRIDIUM OXIDE ELECTRODE FOR QUANTITATIVELY DETECTING PH IN SULFIDE ION ENVIRONMENT, AND PREPARATION METHOD AND USE THEREOF

CROSS REFERENCE TO THE RELATED APPLICATIONS

This application is a continuation application of International Application No. PCT/CN2021/140251, filed on Dec. 22, 2021, which is based upon and claims priority to Chinese Patent Application No. 202011581887.X, filed on Dec. 28, 2020, the entire contents of which are incorporated herein by reference.

TECHNICAL FIELD

The present disclosure relates to the technical field of preparation of ion-selective film, in particular to an iridium/iridium oxide electrode for quantitatively detecting pH in an $S^{2-}$-environment, and a preparation method and use thereof.

BACKGROUND pH is an important parameter in the study of ocean chemistry. The in situ measurement of seawater pH is of great significance to the research of various fields of ocean chemistry. However, in situ pH measurement is very difficult in a high-pressure environment of the deep sea, especially near hydrothermal vents rich in reducing substances.

Metal electrodes can work normally under high temperature and high pressure. However, in the presence of redox substances, the metal electrodes are prone to potential drift, which reduces detection accuracy. At present, Nafion produced by DuPont is widely used. The Nafion can effectively prevent the permeation of redox substances, and prevent chemical substances in the water from affecting the normal operation of electrodes. However, in a polar environment, sulfonic acid groups of Nafion's fluorocarbon backbone side chains tend to gather in clusters due to electromagnetic attraction. As a result, microscopic phase separation occurs between the sulfonic acid groups and the fluorocarbon backbone, allowing the passage of smaller-radius particles such as sulfide ions. These sulfide ions have a reducing property and can generate false signals on the surface of a working electrode, thereby affecting the accuracy of the detection.

Sulfonated polyether ether ketone/ionic liquid (SPEEK/IL) composite film is a mixture of two organic substances that are mixed uniformly. It is found from comparison of an internal shape of the SPEEK film and the Nafion film that permeation channels inside the SPEEK film are narrower and more tortuous than those of the Nafion film. Accordingly, the SPEEK film can exhibit desirable resistance to sulfide ion interference. Furthermore, the SPEEK film has excellent proton conductivity and thermal stability, lower cost, and high environmental protection effect, and can be widely used in long-term pH value detection for the deep sea exploration, chemical industry, and other fields.

SUMMARY

Aiming at the deficiencies of the prior art, a purpose of the present disclosure is to provide an iridium/iridium oxide electrode for quantitatively detecting pH in an $S^{2-}$ environment, and a preparation method and use thereof.

The present disclosure provides an iridium/iridium oxide electrode for quantitatively detecting pH in an $S^{2-}$ environment, where a sensitive layer at an end of a pH electrode main body is provided with a SPEEK/IL sandwich structure; the SPEEK/IL sandwich structure includes two layers of SPEEK/SiO$_x$/IL composite film, namely an inner layer of SPEEK/SiO$_x$/IL composite film and an outer layer of SPEEK/SiO$_x$/IL composite film, and one layer of SPEEK film, and the SPEEK film serves as an outermost layer of the SPEEK/IL sandwich structure; an ionic liquid layer is separately filled between the pH electrode main body and the inner layer of SPEEK/SiO$_x$/IL composite film, between the two layers of SPEEK/SiO$_x$/IL composite film, and between the outer layer of SPEEK/SiO$_x$/IL composite film and the SPEEK film; the pH electrode main body is an Ir/IrO$_x$ pH electrode; and the SPEEK/IL sandwich structure completely covers IrO$_x$ on a surface of the pH electrode.

An IL of the IL layer is [HOEtMIM][Cl] with a structural formula as follows.

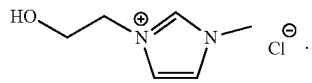

The IL refers to an organic salt that is liquid at or near a room temperature and completely composed of anions and cations. The IL has low volatility, strong conductivity, high viscosity, low vapor pressure, stable properties, excellent designability, desirable solubility for various substances, and no pollution. Therefore, the IL is called a "green solvent". In the present disclosure, the selected hydroxyl-functionalized IL ([HOEtMIM][Cl]) has extremely strong conductivity. The imidazole group in this IL is both acidic and basic, and can react with the sulfonic acid groups in SPEEK. In this way, the loss of IL during use is reduced, thereby increasing the conductivity of the composite film.

The SPEEK has a molecular structure as shown below:

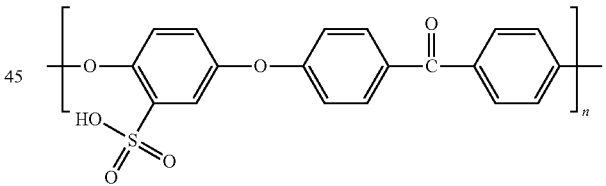

The SPEEK is a sulfonated product of polyether ether ketone (PEEK). The SPEEK has desirable proton conductivity and low cost. The SPEEK also includes narrow and tortuous ion permeation channels, which can isolate ions with a smaller particle size. Currently, the only problem to be solved is that the SPEEK has poor proton conductivity. In the present disclosure, a DMF solution of SPEEK is uniformly mixed with the IL, thereby avoiding the poor proton conductivity of the SPEEK and making up for the defect that the IL is easy to dissipate in polar solvents.

The present disclosure further provides a preparation method of the pH electrode with a SPEEK/IL sandwich structure, including the following steps:

1) pouring polyether ether ketone (PEEK) particles into concentrated sulfuric acid, and dissolving by stirring continuously; after the PEEK particles are completely dissolved, heating a resulting solution to 40° C. to 60° C., and conducting vulcanization for 2 h to 4 h in an inert gas atmosphere;

2) slowly pouring a polymer solution obtained in step 1) into an ice-water mixture to terminate the vulcanization, collecting obtained formed particles, washing the particles with water until a pH value of a washing solution reaches 6 to 7, and drying the particles in an oven at 50° C. to 70° C. for 12 h to 48 h to obtain SPEEK particles;

3) pouring the SPEEK particles into a solvent, and dissolving by stirring to obtain a 10 wt % SPEEK solution;

4) mixing an inorganic acid, a silicate, deionized water, and an alcohol as raw materials at a molar ratio of (0.01-0.1):1:(2-8):(2-8), and stirring to form a homogeneous solution as a precursor solution; pouring the SPEEK solution obtained in step 3) into the homogeneous solution and stirring uniformly, and adding the IL dropwise and stirring to obtain a SPEEK/SiO$_x$/IL solution;

5) immersing the Ir/IrO$_x$ pH electrode into the IL, taking out and drying, such that a surface of the Ir/IrO$_x$ pH electrode is covered with an IL layer; immersing an obtained IL layer-covered pH electrode into the SPEEK/SiO$_x$/IL solution, taking out and air-drying upside down to form one layer of SPEEK/SiO$_x$/IL composite film on a surface of the IL layer-covered pH electrode;

6) repeating step 5) once on a final electrode product obtained in step 5) to obtain two layers of SPEEK/SiO$_x$/IL composite film; immersing an obtained bilayer SPEEK/SiO$_x$/IL composite film-covered pH electrode into the IL, taking out and drying, such that a surface of the outer SPEEK/SiO$_x$/IL composite film is covered with an IL layer; and 7) immersing a final pH electrode product obtained in step 6) into the SPEEK solution, taking out and air-drying upside down to obtain a pH electrode with a SPEEK/IL sandwich structure.

Further, in step 4), the inorganic acid is hydrochloric acid, the silicate is tetraethyl orthosilicate (TEOS), and the alcohol is ethanol; and the inorganic acid, the silicate, the deionized water, and the alcohol are at a molar ratio of 0.01:1:4:4.

Multi-layer film coating is generally conducted on pH electrodes to reduce external interference. The traditional multi-layer SPEEK coating may reduce the proton conductivity due to a gap between two adjacent layers. In the present disclosure, the overall proton conductivity is increased by setting the SPEEK/IL sandwich structure on the sensitive layer of the iridium/iridium oxide electrode, and then filling the two layers of the SPEEK/SiO$_x$/IL film with free IL.

In the present disclosure, the composite film with a SPEEK/IL sandwich structure is composed of two layers of evenly-mixed organic semipermeable SPEEK/SiO$_x$/IL film and free IL in sequence. The IL mainly exists in ion clusters formed by the sulfonic acid groups of the SPEEK. The imidazole group in the IL is both basic and acidic, and can react with sulfonic acid groups. In this way, the microscopic phase separation between the sulfonic acid groups and the fluorocarbon skeleton is reduced while increasing the proton conductivity of the organic composite film. TEOS can generate abundant hydrogen bonds with the IL and SPEEK, and form a grid-like structure between long-chain molecules of the SPEEK, thereby converting free IL into a bound state and making the IL and SPEEK molecules more tightly bound. When the iridium/iridium oxide electrode coated with the composite film is immersed in a solution, the grid-like SiO$_x$ can effectively prevent IL molecules from dissipating in the solution, thus significantly prolonging a service life of the electrode.

In the present disclosure, by exploring an internal shape of the SPEEK film, it is found that permeation channels inside the SPEEK film is narrower and more tortuous than those of the Nafion film, such that a formed organic semipermeable film is denser. Accordingly, the pH electrode with a SPEEK/IL sandwich structure can exhibit desirable resistance to redox ion interference. Furthermore, the pH electrode has excellent mechanical strength and thermal stability, lower cost, and high environmental protection effect, and can be widely used in long-term pH value detection for the deep sea exploration, chemical industry and other fields.

DETAILED DESCRIPTION OF THE EMBODIMENTS

The present disclosure is further described below with reference to the accompanying drawings and examples.

Figure 1:
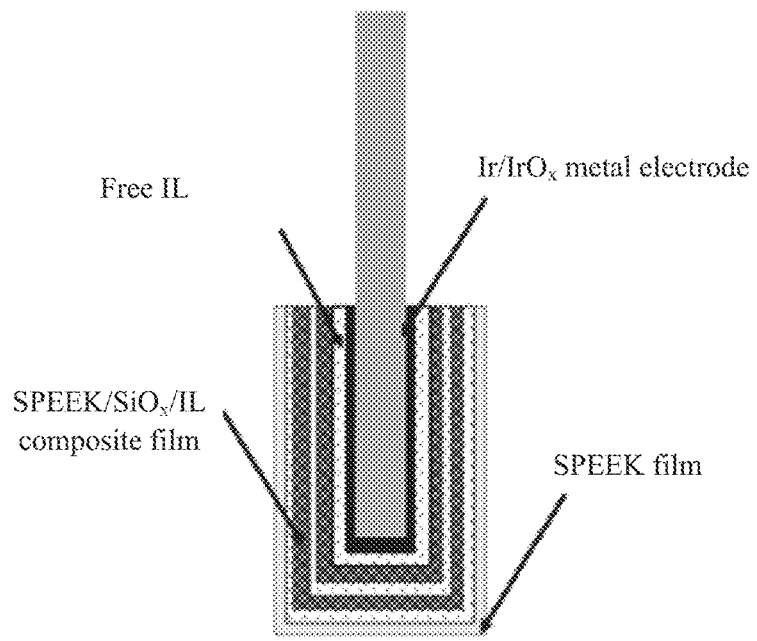
FIG. 1 shows a structural schematic diagram of the pH electrode with a SPEEK/IL sandwich structure of the present disclosure.

As shown in FIG. 1, in an embodiment, a pH electrode main body is an Ir/IrO$_x$ pH electrode; a SPEEK/IL sandwich structure covers an IrO$_x$ layer of the pH electrode. An IL is [HOEtMIM][Cl]; the composite film with a SPEEK/IL sandwich structure is composed of two layers of evenly-mixed organic semipermeable SPEEK/SiO$_x$/IL film and free IL that are laminated in sequence. The IL mainly exists in ion clusters formed by the sulfonic acid groups of the SPEEK. The imidazole group in the IL is both basic and acidic, and can react with sulfonic acid groups. In this way, the microscopic phase separation between the sulfonic acid groups and the fluorocarbon skeleton is reduced while increasing the proton conductivity of the organic composite film. The overall proton conductivity is increased by filling two layers of SPEEK/SiO$_x$/IL film with free IL. Meanwhile, the presence of high-concentration IL in the organic semi-permeable film meets the requirement of fast response as a pH electrode.

Example 1

1) PEEK particles were poured into concentrated sulfuric acid, and dissolved by stirring continuously; after the PEEK particles were completely dissolved, a resulting solution was heated to 50° C., and vulcanization was conducted for 3 h in an inert gas atmosphere.
2) A polymer solution obtained in step 1) was slowly poured into an ice-water mixture to terminate the vulcanization, obtained formed particles were collected, the particles were washed with water until a pH value of a washing solution reached 6 to 7, and the particles were air-dried and then dried in an oven at 70° C. for 16 h to obtain SPEEK particles.
3) The SPEEK particles were poured into a solvent, and dissolved by stirring to obtain a 10 wt % SPEEK solution.
4) HCl, TEOS, deionized water, and ethanol as raw materials were mixed at a molar ratio of 0.01:1:4:4, and stirred to form a homogeneous solution; the SPEEK solution obtained in step 3) was poured into the homogeneous solution and stirred uniformly, and the IL was added dropwise and stirred to obtain a SPEEK/SiO$_x$/IL solution.
5) The Ir/IrO$_x$ pH electrode was immersed into the IL, taken out and dried, such that a surface of the Ir/IrO$_x$ pH electrode was covered with an IL layer; an obtained IL layer-covered pH electrode was immersed into the SPEEK/SiO$_x$/IL solution for 5 s, the electrode was turned such that the electrode was completely covered by the solution, taken out and air-dried upside down to form one layer of SPEEK/SiO$_x$/IL composite film on a surface of the IL layer-covered pH electrode.
6) Step 5) was repeated once on a final electrode product obtained in step 5) to obtain two layers of SPEEK/SiO$_x$/IL composite film; an obtained bilayer SPEEK/SiO$_x$/IL composite film-covered pH electrode was immersed into the IL, taken out and dried, such that a surface of an outer layer of SPEEK/SiO$_x$/IL composite film was covered with an IL layer.
7) A final pH electrode product obtained in step 6) was immersed into the SPEEK solution, taken out and air-dried upside down to obtain a pH electrode with a SPEEK/IL sandwich structure.

Figure 2:
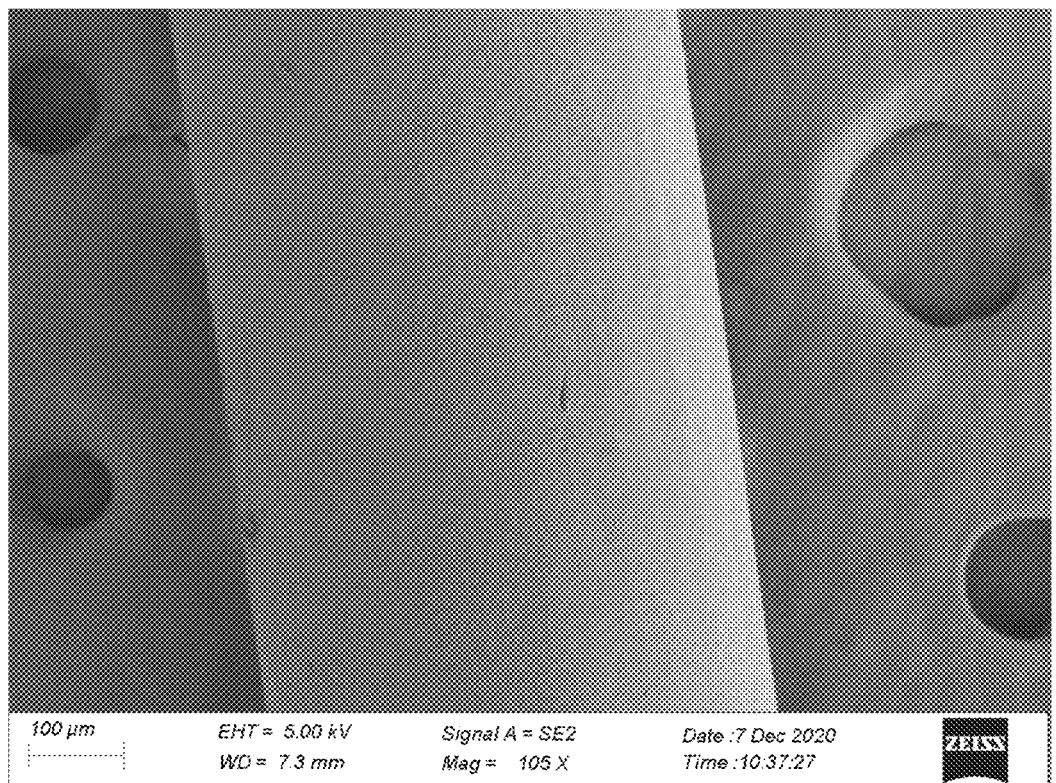
FIG. 2 shows a scanning electron microscopy (SEM) image (100 μm) of a surface of an electrode obtained in Example 1.

As shown in FIG. 2, a complete and uniform composite film with a SPEEK/IL sandwich structure was formed on the Ir/IrO$_x$ pH electrode by a drop coating method, and a sensitive layer of the pH electrode was completely coated.

Figure 3:
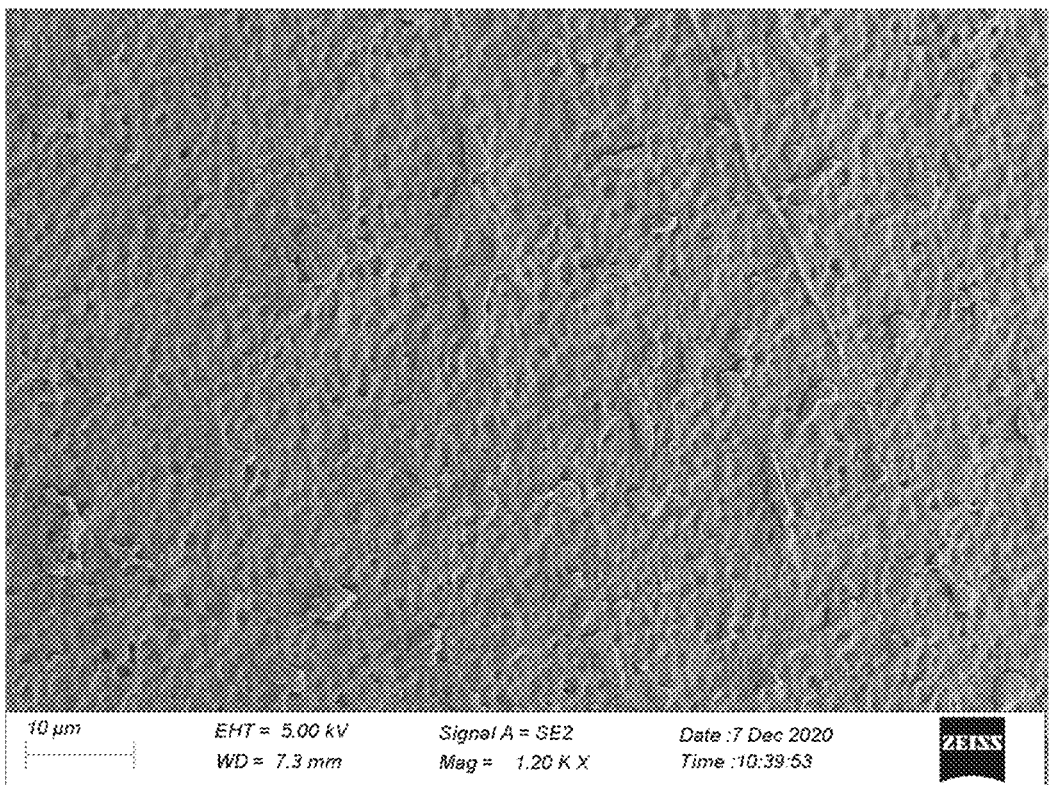
FIG. 3 shows a SEM image (2 μm) of the surface of the electrode obtained in Example 1.
Figure 4:
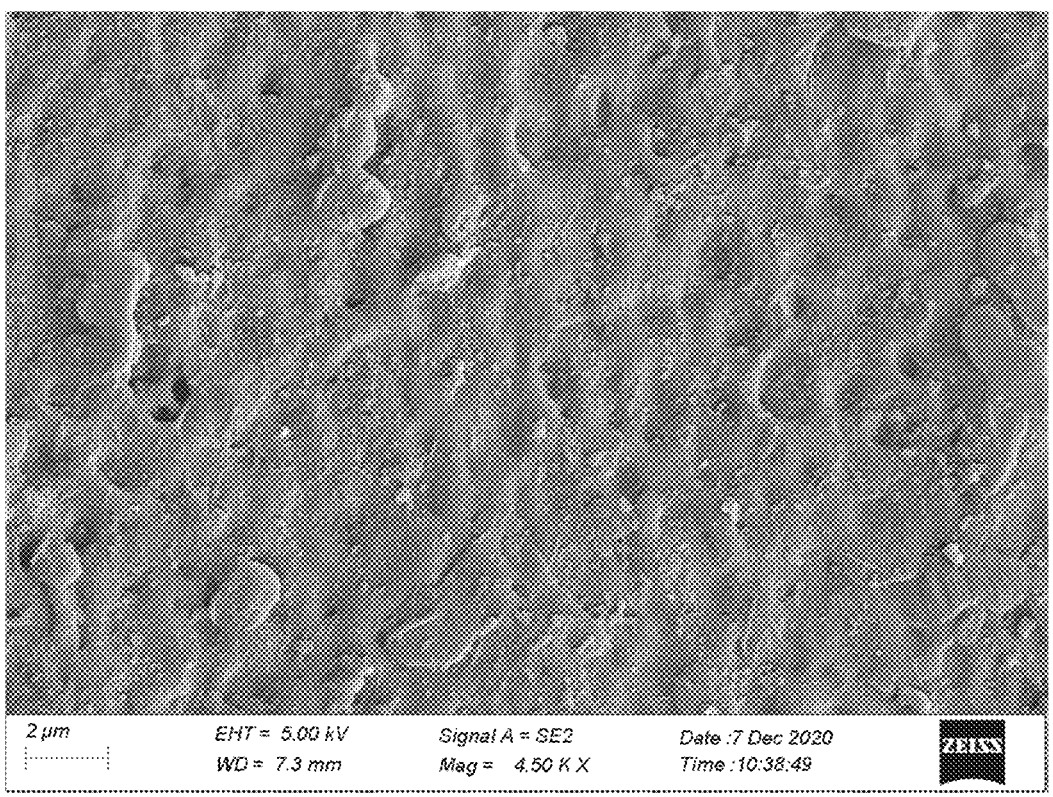
FIG. 4 shows a SEM image (10 μm) of the surface of the electrode obtained in Example 1.

As shown in FIG. 3 and FIG. 4, the composite film had a complete surface without obvious defects and damages.

Figure 5:
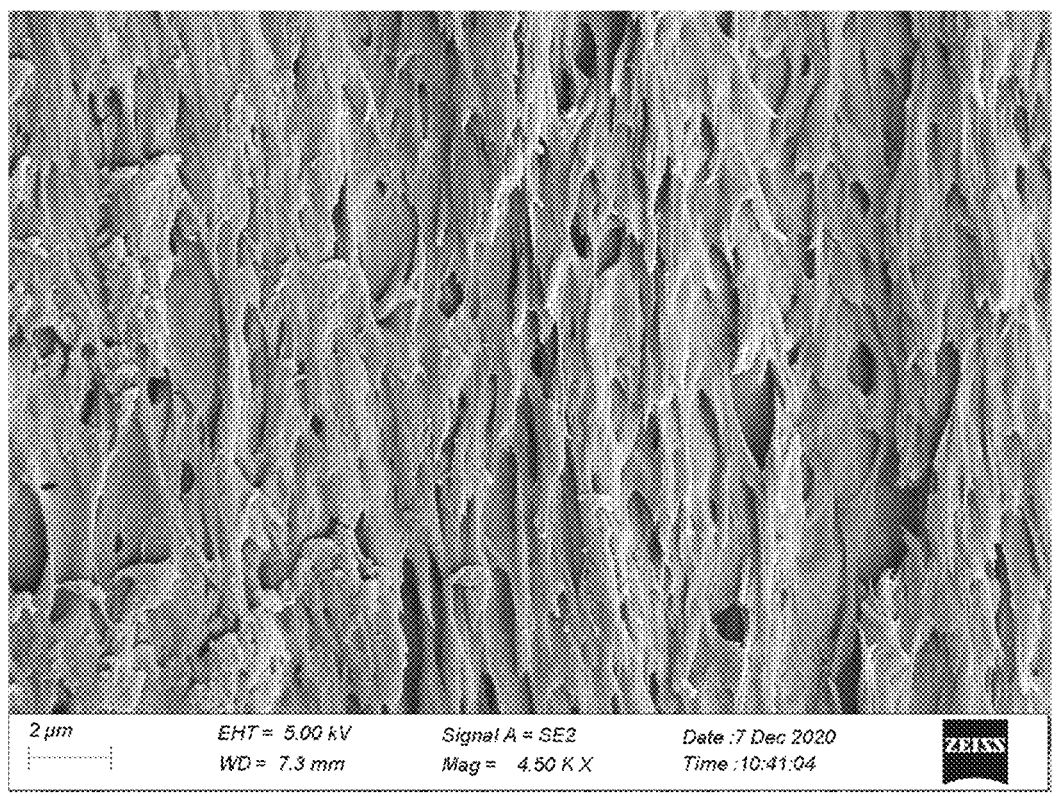
FIG. 5 shows a SEM image (2 μm) of a cross-section of the SPEEK/SiO$_x$/IL composite film on the surface of the electrode obtained in Example 1.

As shown in FIG. 5, the SP/SiO$_x$/IL layer had a dense structure, and the IL and SiO$_x$ showed desirable dispersion and compatibility in the SPEEK. The SP/SiO$_x$/IL layer and the IL layer had obvious delamination, forming an expected sandwich structure.

Figure 6:
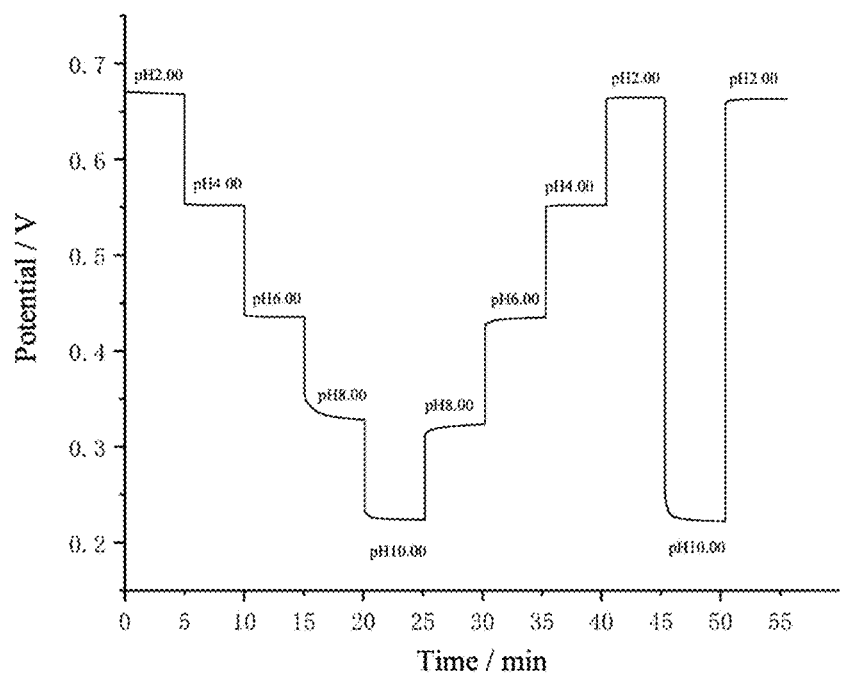
FIG. 6 shows a potential response of the electrode obtained in Example 1 for a pH change of a solution.

As shown in FIG. 6, the modified Ir/IrO$_x$ pH electrode still had a rapid and accurate response to pH value changes of an external solution, indicating that the IL had a significant improvement in the proton conductivity of SPEEK.

Figure 7:
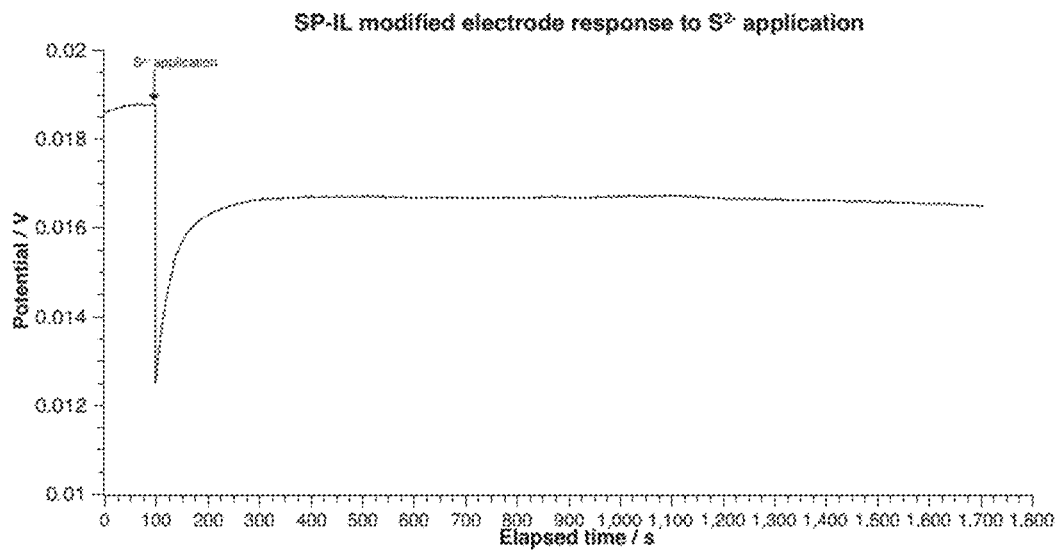
FIG. 7 shows a response curve of the electrode obtained in Example 1 in an S$^{2-}$ solution of 10$^{-3}$ M.

As shown in FIG. 7, after the Ir/IrO$_x$ pH electrode with a SPEEK/IL sandwich structure was immersed in a Na$_2$S buffer with a concentration of $10^{-3}$ mol/L, the electrode could accurately measure the pH value of the solution within 150 s, and the potential of the electrode remained stable within 30 min. This proved that the electrode was not affected by $S^{2-}$ in the solution, and could still work normally in the presence of $S^{2-}$.

Example 2

1) PEEK particles were poured into concentrated sulfuric acid, and dissolved by stirring continuously; after the PEEK particles were completely dissolved, a resulting solution was heated to 50° C., and vulcanization was conducted for 3 h in an inert gas atmosphere.
2) A polymer solution obtained in step 1) was slowly poured into an ice-water mixture to terminate the vulcanization, obtained formed particles were collected, the particles were washed with water until a pH value of a washing solution reached 6 to 7, and the particles were air-dried and then dried in an oven at 70° C. for 16 h to obtain SPEEK particles.
3) The SPEEK particles were poured into a solvent, and dissolved by stirring to obtain a 10 wt % SPEEK solution.
4) HCl, TEOS, deionized water, and ethanol as raw materials were mixed at a molar ratio of 0.01:1:4:4, and stirred to form a homogeneous solution as a precursor solution; the SPEEK solution obtained in step 3) was poured into the homogeneous solution and stirred uniformly, and the IL was added dropwise and stirred to obtain a SPEEK/SiO$_x$/IL solution.
5) The Ir/IrO$_x$ pH electrode was immersed into the SPEEK/IL solution for 5 s, the electrode was turned such that the electrode was completely covered by the solution, taken out and air-dried upside down to form one layer of SPEEK/SiO$_x$/IL composite film on a surface of the IL layer-covered pH electrode.
6) Step 5) was repeated once on a final electrode product obtained in step 5) to obtain two layers of SPEEK/IL composite film, to obtain a pH electrode with a SPEEK/IL sandwich structure that had been coated.

Figure 8:
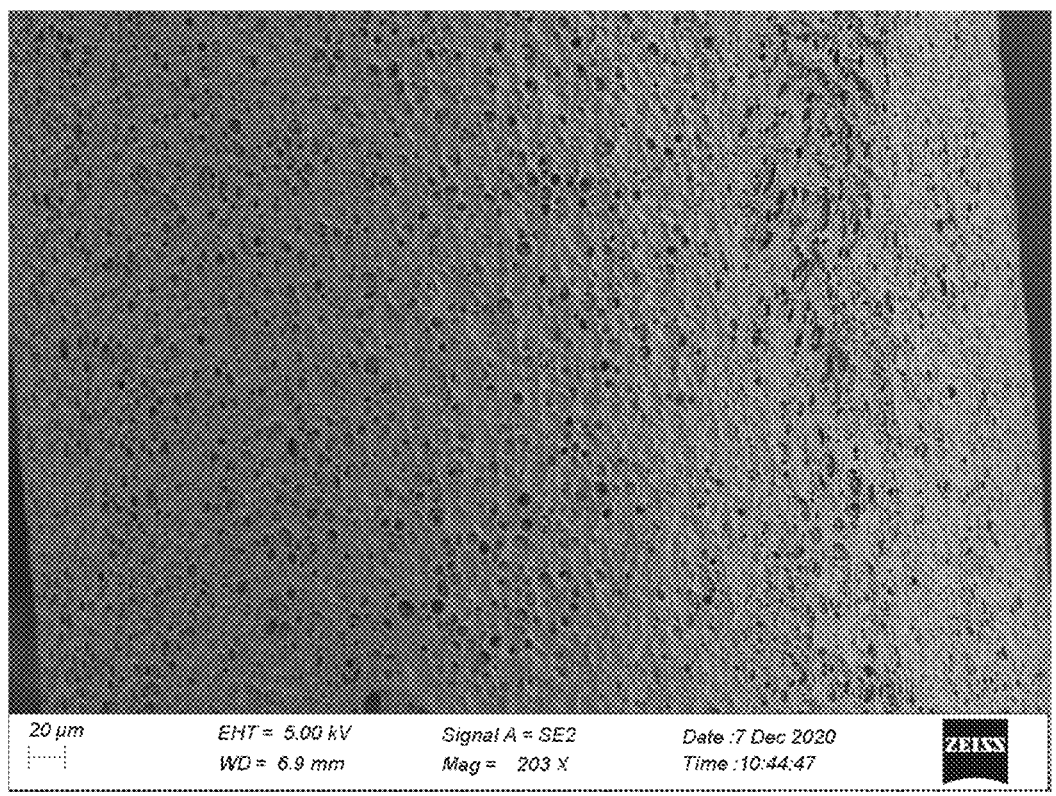
FIG. 8 shows a SEM image (100 μm) of a surface of an electrode obtained in Example 2.

As shown in FIG. 8, a complete and uniform composite film with a SPEEK/IL sandwich structure was formed on the Ir/IrO$_x$ pH electrode by a drop coating method, and a sensitive layer of the pH electrode was completely coated.

Figure 9:
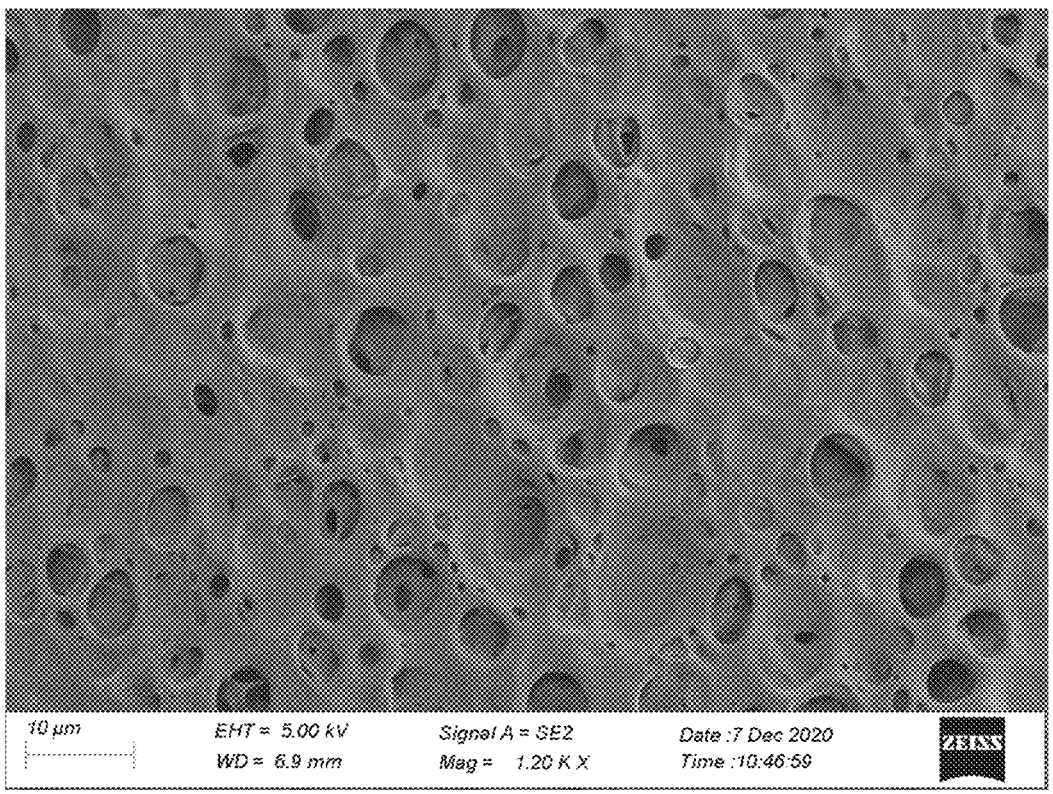
FIG. 9 shows a SEM image (2 μm) of the surface of the electrode obtained in Example 2.
Figure 10:
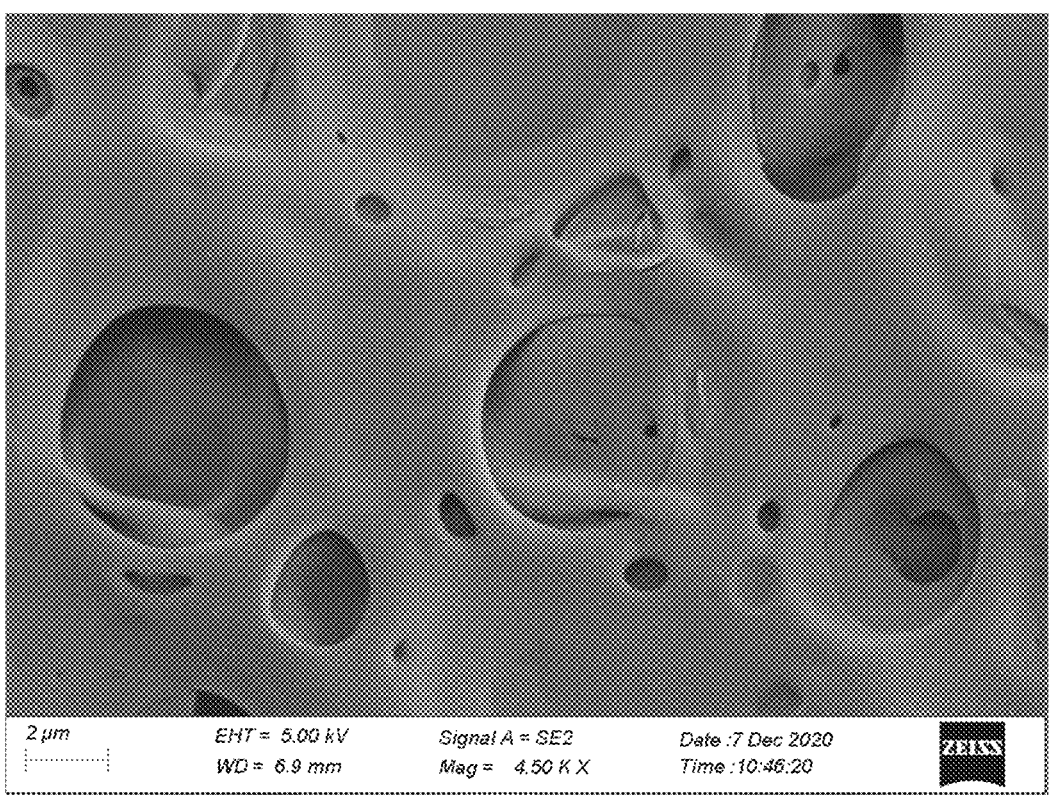
FIG. 10 shows a SEM image (10 μm) of the surface of the electrode obtained in Example 2.

As shown in FIG. 9 and FIG. 10, circular holes of different sizes were distributed on the surface of the composite film of the electrode prepared in Example 2, and multiple layers of SP/SiO$_x$/IL overlapped each other, and almost no surface of the metal electrode was exposed.

Figure 11:
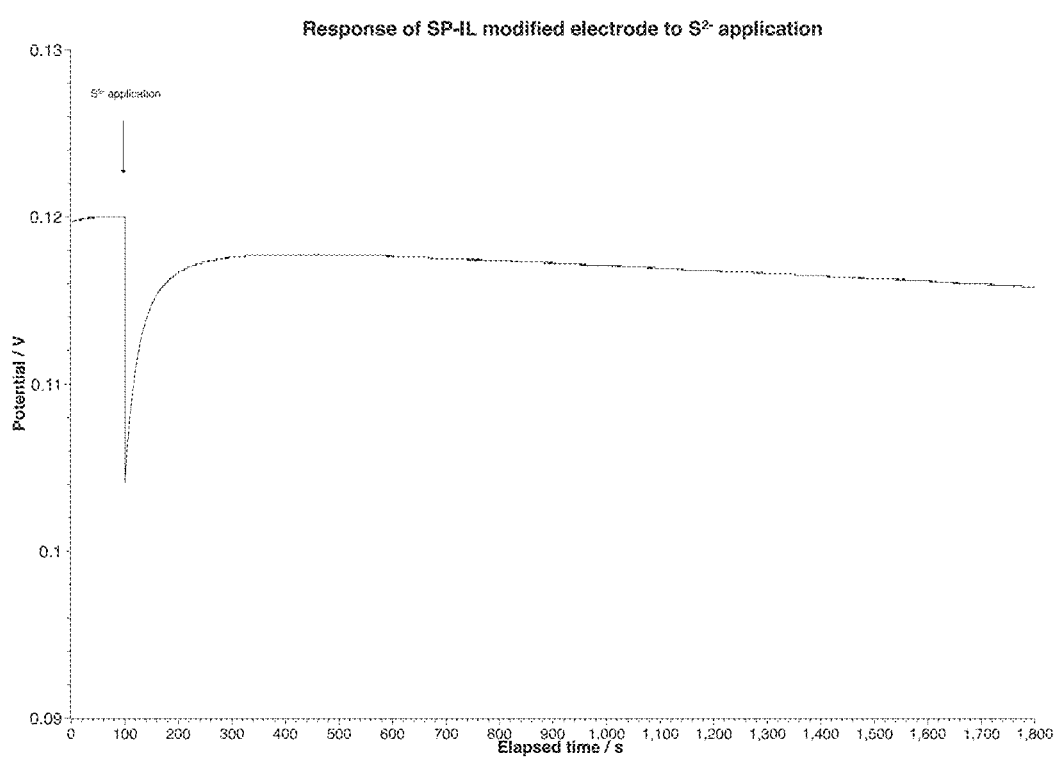
FIG. 11 shows a response curve of the electrode obtained in Example 2 in the S$^{2-}$ solution of 10$^{-3}$ M.

As shown in FIG. 11, the electrode prepared in Example 2 could accurately measure the pH value of the solution by immersing a stabilized electrode in the Na$_2$S buffer with a concentration of $10^{-3}$ mol/L. However, the electrode potential gradually decreased after 400 s, indicating that the electrode could eliminate the influence of reducing ions in the solution within a short time. As time went by, $S^{2-}$ could still affect the electrode potential through the pores of the composite film.

What is claimed is:
1. An iridium/iridium oxide electrode for quantitatively detecting a pH in a sulfide ion environment, wherein a sensitive layer at an end of a pH electrode main body is provided with a SPEEK/IL (sulfonate polyether ether ketone/ionic liquid) sandwich structure; the SPEEK/IL sandwich structure comprises two layers of SPEEK/SiO$_x$/IL composite film and one layer of SPEEK film, and the SPEEK film serves as an outermost layer of the SPEEK/IL sandwich structure; an ionic liquid (IL) layer is separately filled between the pH electrode main body and an inner layer of the two layers of SPEEK/SiO$_x$/IL composite film, between the two layers of SPEEK/SiO$_x$/IL composite film, and between an outer layer of the two layers of SPEEK/SiO$_x$/IL composite film and the SPEEK film; the pH electrode main body is an Ir/IrO$_x$ pH electrode; the SPEEK/IL sandwich structure completely covers IrO$_x$ on a surface of the pH electrode main body; wherein SPEEK refers to a sulfonated polyether ether ketone, and IL refers to an ionic liquid; and the IL of the IL layer is [HOEtMIM][Cl] with a structural formula as follows:

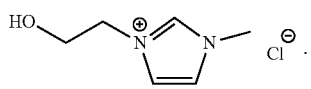

2. A preparation method of the iridium/iridium oxide electrode for quantitatively detecting the pH in the sulfide ion environment according to claim 1, comprising the following steps:
1) pouring polyether ether ketone (PEEK) particles into a concentrated sulfuric acid, and dissolving by stirring continuously; after the PEEK particles are completely dissolved, heating a resulting solution to 35° C. to 70° C., and conducting a vulcanization for 2 h to 4 h in an inert gas atmosphere;
2) slowly pouring a polymer solution obtained in step 1) into an ice-water mixture to terminate the vulcanization, collecting obtained formed particles, washing the obtained formed particles with water until a pH value of a washing solution reaches 6 to 7, and drying the obtained formed particles in an oven at 50° C. to 70° C. for 12 h to 48 h to obtain SPEEK particles;
3) pouring the SPEEK particles into a solvent, and dissolving by stirring to obtain a 10 wt % SPEEK solution;
4) mixing an inorganic acid, silicate, deionized water, and alcohol as raw materials at a molar ratio of (0.01-0.1):1:(2-8):(2-8), and stirring to form a homogeneous solution; pouring the 10 wt % SPEEK solution obtained in step 3) into the homogeneous solution and stirring uniformly, and adding the IL dropwise and stirring to obtain a SPEEK/SiO$_x$/IL solution;
5) immersing the Ir/IrO$_x$pH electrode into the IL, taking out and drying, to make a surface of the Ir/IrO$_x$ pH electrode covered with the IL layer; immersing an obtained IL layer-covered pH electrode into the SPEEK/SiO$_x$/IL solution, taking out and air-drying upside down to form one layer of SPEEK/SiO$_x$/IL composite film on a surface of the obtained IL layer-covered pH electrode;
6) repeating step 5) once on a single-layer SPEEK/SiO$_x$/IL composite film-covered pH electrode obtained in step 5) to obtain the two layers of SPEEK/SiO$_x$/IL composite film; immersing an obtained bilayer SPEEK/SiO$_x$/IL composite film-covered pH electrode into the IL, taking out and drying, to make a surface of the outer layer of the two layers of SPEEK/SiO$_x$/IL composite film covered with the IL layer; and
7) immersing a final pH electrode product obtained in step 6) into the 10 wt % SPEEK solution, taking out and air-drying upside down to obtain an Ir/IrO$_x$ pH electrode with the SPEEK/IL sandwich structure.

3. The preparation method according to claim 2, wherein in step 1), the concentrated sulfuric acid has a concentration of 95% to 98%; in step 1), the dissolving is conducted at less than 30° C.; and the PEEK particles and the concentrated sulfuric acid are at a mass ratio of 1:(20-40).

4. The preparation method according to claim 3, wherein in step 4), the homogeneous solution and the 10 wt % SPEEK solution are at a volume ratio of 1:(4-7.5); and the IL and the 10 wt % SPEEK solution are at a volume ratio of 1:(1-3.3).

5. The preparation method according to claim 4, wherein in steps 4) and 5), the IL is the [HOEtMIM][Cl] with the structural formula as follows:

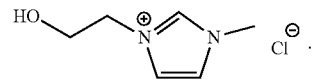

6. The preparation method according to claim 3, wherein the obtained IL layer-covered pH electrode is immersed in the SPEEK/SiO$_x$/IL solution for 5 s to 10 s or the final pH electrode product is immersed in the 10 wt % SPEEK solution for 5 s to 10 s; and the Ir/IrO$_x$ pH electrode is immersed in the IL for 1 h to 12 h at 50° C. to 80° C. with help of an ultrasonic wave.

7. The preparation method according to claim 6, wherein in steps 4) and 5), the IL is the [HOEtMIM][Cl] with the structural formula as follows:

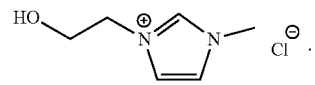

8. The preparation method according to claim 3, wherein in steps 4) and 5), the IL is the [HOEtMIM][Cl] with the structural formula as follows:

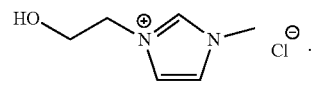

9. The preparation method according to claim 2, wherein in step 3), the solvent is selected from the group consisting of N,N-dimethylformamide (DMF) and N,N-dimethylaniline (DMA).

10. The preparation method according to claim 9, wherein in steps 4) and 5), the IL is the [HOEtMIM][Cl] with the structural formula as follows:

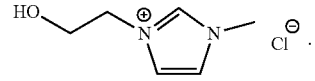

11. The preparation method according to claim 2, wherein in step 4), the inorganic acid is hydrochloric acid, the silicate is tetraethyl orthosilicate (TEOS), and the alcohol is ethanol; and the inorganic acid, the silicate, the deionized water, and the alcohol are at a molar ratio of 0.01:1:4:4.

12. The preparation method according to claim 11, wherein in steps 4) and 5), the IL is the [HOEtMIM][Cl] with the structural formula as follows:

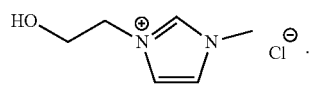
13. A method for quantitatively detecting pH in a sulfide ion environment using the iridium/iridium oxide electrode according to claim 1, comprising the step of immersing the iridium/iridium oxide electrode in the sulfide environment.
* * * * *